(12) United States Patent
Alshinnawi et al.

(10) Patent No.: US 10,146,979 B2
(45) Date of Patent: Dec. 4, 2018

(54) PROCESSING VISUAL CUES TO IMPROVE DEVICE UNDERSTANDING OF USER INPUT

(71) Applicant: LENOVO ENTERPRISE SOLUTIONS (SINGAPORE) PTE. LTD., Singapore (SG)

(72) Inventors: Shareef F. Alshinnawi, Apex, NC (US); Gary D. Cudak, Wake Forest, NC (US); Jeffrey S. Holland, Newton, NC (US); Pradeep Ramineni, Cary, NC (US)

(73) Assignee: Lenovo Enterprise Solutions (Singapore) PTE. LTD., Singapore (SG)

( * ) Notice: Subject to any disclaimer, the term of this patent is extended or adjusted under 35 U.S.C. 154(b) by 45 days.

(21) Appl. No.: 14/729,805

(22) Filed: Jun. 3, 2015

(65) Prior Publication Data
US 2016/0357729 A1  Dec. 8, 2016

(51) Int. Cl.
*G06F 17/00* (2006.01)
*G06K 9/00* (2006.01)
*G06F 17/27* (2006.01)
*G06K 9/72* (2006.01)

(52) U.S. Cl.
CPC ............ *G06K 9/00* (2013.01); *G06F 17/276* (2013.01); *G06F 17/2735* (2013.01); *G06K 9/00671* (2013.01); *G06K 9/723* (2013.01)

(58) Field of Classification Search
CPC ........................... G06F 17/2735; G06F 17/276
See application file for complete search history.

(56) References Cited

U.S. PATENT DOCUMENTS

| | | | | |
|---|---|---|---|---|
| 5,896,321 | A * | 4/1999 | Miller | G06F 3/023 365/189.15 |
| 7,451,389 | B2 * | 11/2008 | Huynh | G06F 17/2785 715/210 |
| 2001/0031088 | A1 * | 10/2001 | Natori | G06K 9/723 382/229 |
| 2004/0220919 | A1 * | 11/2004 | Kobayashi | G06F 17/30616 |
| 2005/0004798 | A1 * | 1/2005 | Kaminuma | G10L 15/197 704/250 |
| 2007/0074131 | A1 * | 3/2007 | Assadollahi | G06F 3/0237 715/816 |
| 2009/0245658 | A1 * | 10/2009 | Fujimoto | G06K 9/6814 382/218 |
| 2009/0326927 | A1 * | 12/2009 | Morin | G06F 17/276 704/10 |

(Continued)

OTHER PUBLICATIONS

Mayhew, "Voice recognition market to reach US$2.5 billion in revenue by 2015", biometricupdate.com (online), May 22, 2014, 2 pages, URL: www.biometricupdate.com/201405/voice-recognition-market-to-reach-us2-5-billion in-revenue-by-2015.

(Continued)

*Primary Examiner* — Mohammed-Ibrahim Zuberi
(74) *Attorney, Agent, or Firm* — Brandon C. Kennedy; Jason A. Friday; Kennedy Lenart Spraggins LLP

(57) ABSTRACT

Processing visual cues to improve understanding of an input is described herein, including receiving a visual cue, the visual cue including visual media of a target; storing a list of words representing the target; and updating a probable words dictionary to include the list of words.

12 Claims, 3 Drawing Sheets

(56) References Cited

U.S. PATENT DOCUMENTS

| | | | |
|---|---|---|---|
| 2010/0070921 A1* | 3/2010 | Rieman | G06F 15/16 715/811 |
| 2010/0318903 A1* | 12/2010 | Ferren | G06F 17/2735 715/259 |
| 2011/0197128 A1* | 8/2011 | Assadollahi | G06F 3/0237 715/259 |
| 2012/0066213 A1* | 3/2012 | Ohguro | G06F 17/30654 707/723 |
| 2012/0245945 A1* | 9/2012 | Miyauchi | G10L 15/06 704/275 |
| 2013/0046544 A1* | 2/2013 | Kay | G06F 3/04883 704/275 |
| 2013/0339002 A1* | 12/2013 | Wakui | G06F 17/2795 704/9 |
| 2016/0085742 A1* | 3/2016 | Mahmud | G06F 17/2775 704/9 |
| 2016/0092436 A1* | 3/2016 | Obayashi | G06F 17/2735 358/1.11 |

OTHER PUBLICATIONS

Mims, "Intel's voice recognition will blow Siri out of the water-because it doesn't use the cloud", qz.com (online), Jan. 27, 2014, 3 pages, URL: qz.com/170668/intels-voice-recognition-will-blow-siri-out-of-the-water-because-it-doesnt-use-the-cloud/.

Klosowski, "How Can I Make My Phone Actually Understand What I'm Saying?", lifehacker.com (online), Oct. 11, 2013, 6 pages, URL: lifehacker.com/how-can-i-make-my-phone-actually-understand-what-im-say-1443895449.

Hof, "Meet the Guy Who Helped Google Beat Apple's Siri", forbes.com (online), May 1, 2013, 7 pages, URL: www.forbes.com/sites/roberthof/2013/05/01/meet-the-guy-who-helped-google-beat-apples-siri/.

* cited by examiner

PROCESSING VISUAL CUES TO IMPROVE DEVICE UNDERSTANDING OF USER INPUT

BACKGROUND OF THE INVENTION

Field of the Invention

The field of the invention is data processing, or, more specifically, methods, apparatus, and products for processing visual cues to improve device understanding of a user input.

Description of Related Art

Voice recognition programs commonly used on mobile computing device frequently misunderstand the audible cues spoken by users. Likewise, auto-complete and smart keyboard applications often lack accuracy when attempting to complete partial terms entered by a user. Some common attempts to solve these deficiencies include the use of history, location, and the like in an attempt to improve accuracy, but such solutions still often result in inaccurate word selection.

SUMMARY OF THE INVENTION

Methods, apparatus, and products for processing visual cues to improve understanding of an input, include receiving a visual cue, the visual cue including visual media of a target; storing a list of words representing the target; and updating a probable words dictionary to include the list of words.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
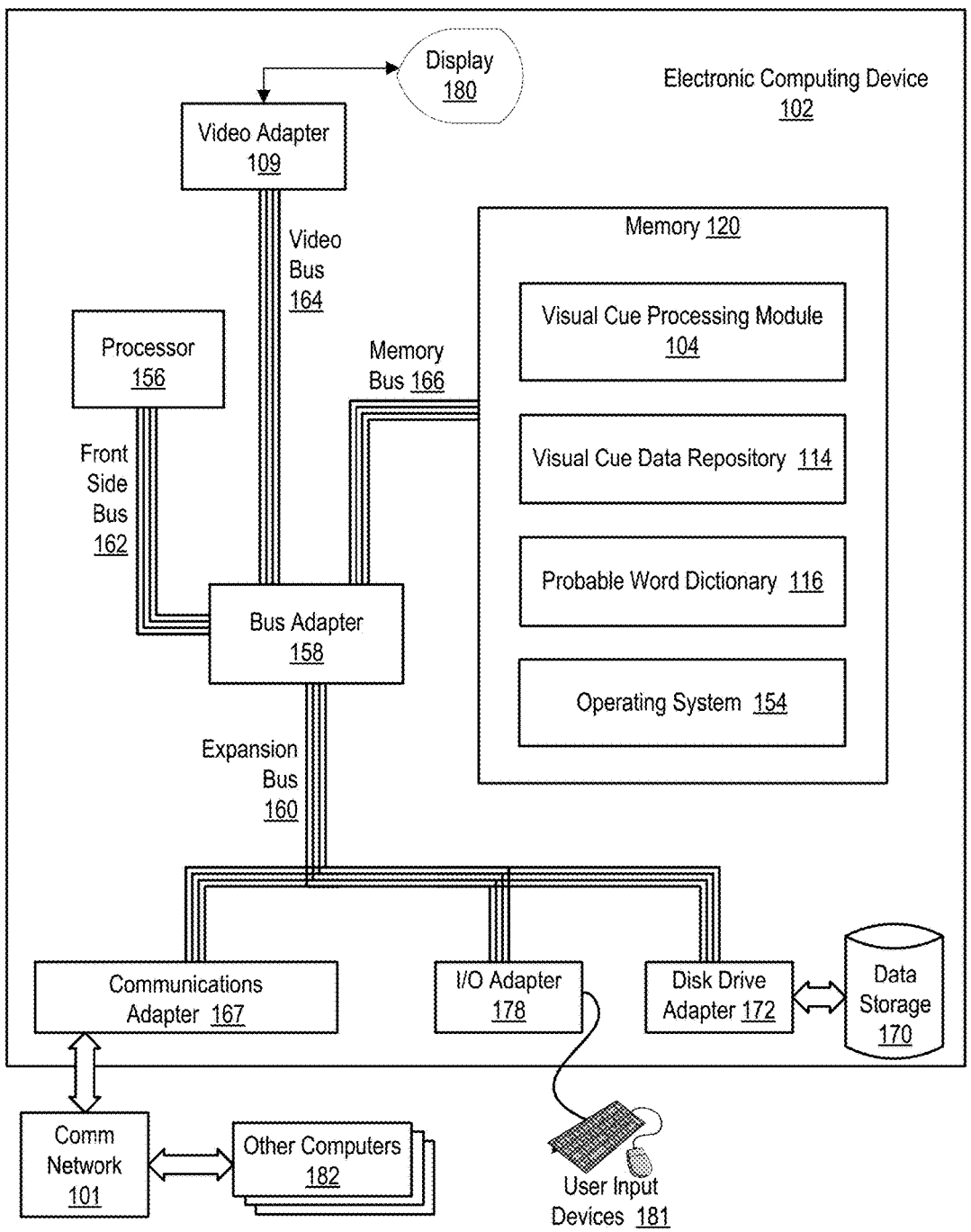
FIG. 1 sets forth a block diagram of an example electronic computing device useful in processing visual cues to improve understanding of an input according to embodiments of the present invention.

Example methods, apparatus, and products for processing visual cues to improve understanding of an input at an electronic computing device in accordance with the present invention are described with reference to the accompanying drawings, beginning with FIG. 1. FIG. 1 sets forth a block diagram of an example electronic computing device (102) useful in processing visual cues to improve understanding of an input at an electronic computing device according to embodiments of the present invention. The electronic computing device (102) of FIG. 1 includes at least one computer processor (156) or 'CPU' as well as computer memory (120) which is connected through a high speed memory bus (166) and bus adapter (158) to processor (156) and to other components of the electronic computing device (102). In the example of FIG. 1, such computer memory (120) may be embodied, for example, as a memory card, flash memory, randomly accessible memory, and so on.

Stored in the computer memory (120) is a visual cue processing module (104). The visual cue processing module (104) may be embodied, for example, as a module of computer program instructions executing on the electronic computing device (102). The visual cue processing module (104) may be configured to obtain and process visual cues that may facilitate better understanding of later user input, according to aspects of the invention. Visual cues may include any type of visual media of a target. Examples of such visual media may include images, such as photographs stored on electronic computing device (102), images viewed on electronic computing device (102) (e.g., images viewed in an Internet browser, social media application, and the like.), video frames from live streaming video sources, video frames from statically stored sources, or any other visual cues that can be obtained by electronic computing device (102). Electronic computing device (102) may be, for example, a mobile phone, smartphone, tablet, wearable computing device (e.g. Google Glass™), laptop computer, desktop computer, and the like. In the case of a wearable computing device, visual cues may also include real-time images being viewed through the wearable computing device.

The visual cue processing module (104) may be further configured to extract visual cue identification data from the obtained visual cue. Visual cue identification data as the term is used in this specification refers to data that may be obtained from a visual cue and utilized to more accurately identify a user's input. To extract visual cue identification data, the visual cue processing module (104) may perform an image or object recognition operation to identify one or more objects in the visual cue. For example, the visual processing module (104) may perform an image or object recognition operation to determine a generic or specific name of a target in the visual cue, as well as color, size, shape, of the object and the like. For example, if the visual cue includes an image of a car, the image or object recognition operation may determine that the target is a car, the color of the car, the number of doors on the car, and the like. In addition, the visual cue processing module (104) may also perform a character recognition operation to extract any textual characters shown in the visual cue. For example, if the visual cue includes a car, the character recognition operation may determine the make and/or model of the car by recognizing characters printed on the car. According to some aspects of the invention, the visual cue processing module (104) may also be configured to extract metadata associated with the visual cue, such as timestamps, location stamps, and the like.

The visual cue processing module (104) may be further configured to generate and store a list of words or terms representing the target. The list of words or terms representing the target may be generated from the extracted visual cues in a visual cue data repository (114). The list of words can be used to personalize a probable words dictionary (116). The visual cue processing module (104) may be configured to update the probable words dictionary (116) over time. Updates to the probable words dictionary (116) may occur each time a new visual cue is obtained. Alternatively, updates to the probable words dictionary (116) may occur on a pre-scheduled basis.

The visual cue processing module (104) may be configured to update the probable words dictionary (116) by first determining whether a word from the list of words extracted from the visual cue already appears in the dictionary. If the word does not appear, visual cue processing module (104) adds the term to the list. According to some aspects of the disclosure, the word may be tagged with a priority value or associated with a weighting factor that places the word near the top of the list. The weighting factor or priority designation may be based on the time at which the visual cue was received or viewed. According to some aspects of the invention, all words placed in the probable words dictionary (116) that were extracted from a visual cue are given a higher priority than words in the dictionary that were not extracted from a visual cue. Even if a word from the list of words extracted from a visual cue already appears in the probable words dictionary (116), the visual cue processing module (104) can increase the priority of the word.

Also stored in memory (120) is an operating system (154). Operating systems useful may include, for example, Apple™ iOS, Palm OS, Android, Blackberry OS, UNIX™, Linux™, Microsoft XP™, AIX™, IBM's i5/OS™, and others as will occur to those of skill in the art. The operating system (154), visual cue processing module (104), visual cue data repository (116), and probable word dictionary (114) in the example of FIG. 1 are shown in memory (120), but many components of such software may be stored in non-volatile memory also, such as, for example, on a flash memory data storage (170) device.

The electronic computing device (102) of FIG. 1 includes drive adapter (172) coupled through expansion bus (160) and bus adapter (158) to processor (156) and other components of the electronic computing device (102). Drive adapter (172) connects non-volatile data storage to the electronic computing device (102) in the form of disk drive (170). The example electronic computing device (102) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards, special purpose buttons, a touchscreen display, cameras, and so on. The example electronic computing device (102) of FIG. 1 includes a video adapter (109), which is an example of an I/O adapter specially designed for graphic output to a display device (180) such as a display screen or touchscreen display. Video adapter (109) is connected to processor (156) through a high speed video bus (164), bus adapter (158), and the front side bus (162), which is also a high speed bus.

The example communications device (102) of FIG. 1 includes a communications adapter (167) for data communications with other electronic computing devices (182) and for data communications with a communications network (101). The communications adapter (167) may utilize an antenna or other device for receiving data via the communications network (101). Communications adapters implement the hardware level of data communications through which one computer sends data communications to another computer, directly or through a data communications network. Examples of communications adapters useful for embodiments of the present invention include modems for wired dial-up communications, Ethernet (IEEE 802.3) adapters for wired data communications, and 802.11 adapters for wireless data communications.

Figure 2:
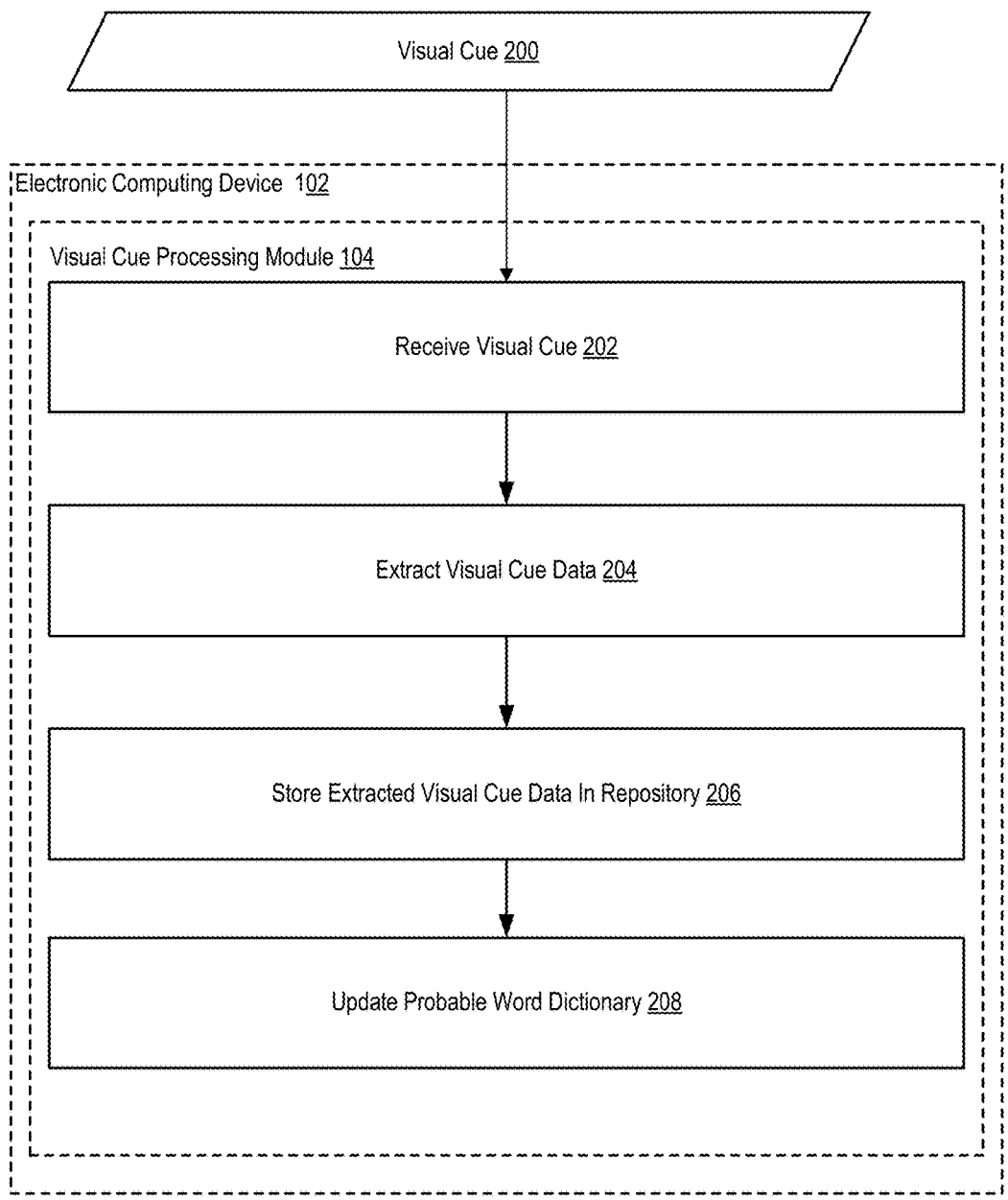
FIG. 2 sets for a flowchart illustrating an example method of processing visual cues to improve understanding of an input according to embodiments of the present invention.

For further explanation, FIG. 2 sets forth a flow chart illustrating an example method for processing visual cues to improve understanding of user inputs, according to embodiments of the present invention. In the example method of FIG. 2, electronic computing device (102) may be embodied as a mobile phone, smartphone, tablet, wearable computing device, and so on.

The example method of FIG. 2 includes receiving (202), by a visual cue processing module (104), a visual cue (200) that includes visual media of a target. In the example method of FIG. 2, the visual cue processing module (104) may be embodied as a module of computer program instructions executed on the electronic computing device (102). Although the visual cue processing module (104) of FIG. 2 is depicted as residing within the electronic computing device (102), readers will appreciate that the visual cue processing module (104) may alternatively be embodied as a module of computer program instructions executing on computer equipment, such as a server.

In the example method of FIG. 2, the visual cue (200) of FIG. 2 represents a visual cue obtainable by electronic computing device (102). Examples of a visual cue (200) any type of visual media including video or images (e.g. photographs) taken by and/or stored on electronic computing device (102), images extracted from webpages viewed on or social media applications accessed by electronic computing device (102), real-time images being viewed through a wearable computing device, and so on.

The example method of FIG. 2 further includes extracting (204), by the visual cue processing module (104), visual cue identification data from the visual cue. Visual cue identification data may include generic or specific names of targets shown in the visual cue, as well as colors, sizes, shapes, locations, letters, numbers, and so on. The visual cue identification data may be obtained by image recognition operations, object recognition operations, character recognition operations, and so on.

The example method of FIG. 2 further includes storing (206) the visual cue data as a list of words or terms in a repository, such as visual cue data repository (114). The list of words or terms may be stored in the repository permanently, or may be stored on a temporary basis until the list of words in evaluated for inclusion in the probable words dictionary (116).

The example method of FIG. 2 further includes updating (208) a probable words dictionary, such as probable words dictionary (116) shown in FIG. 1. Probable words dictionaries are typically used on computing devices, such as smartphones and tablets, to aid in automatically completing text entries or in interpreting spoken word though voice recognition. Such probable word dictionaries typically include a list of most commonly use words. In the example method of FIG. 2, updating (208) the probable words dictionary enhances the typical probable word dictionary by adding words from the list of words stored in visual cue data repository (114).

Figure 3:
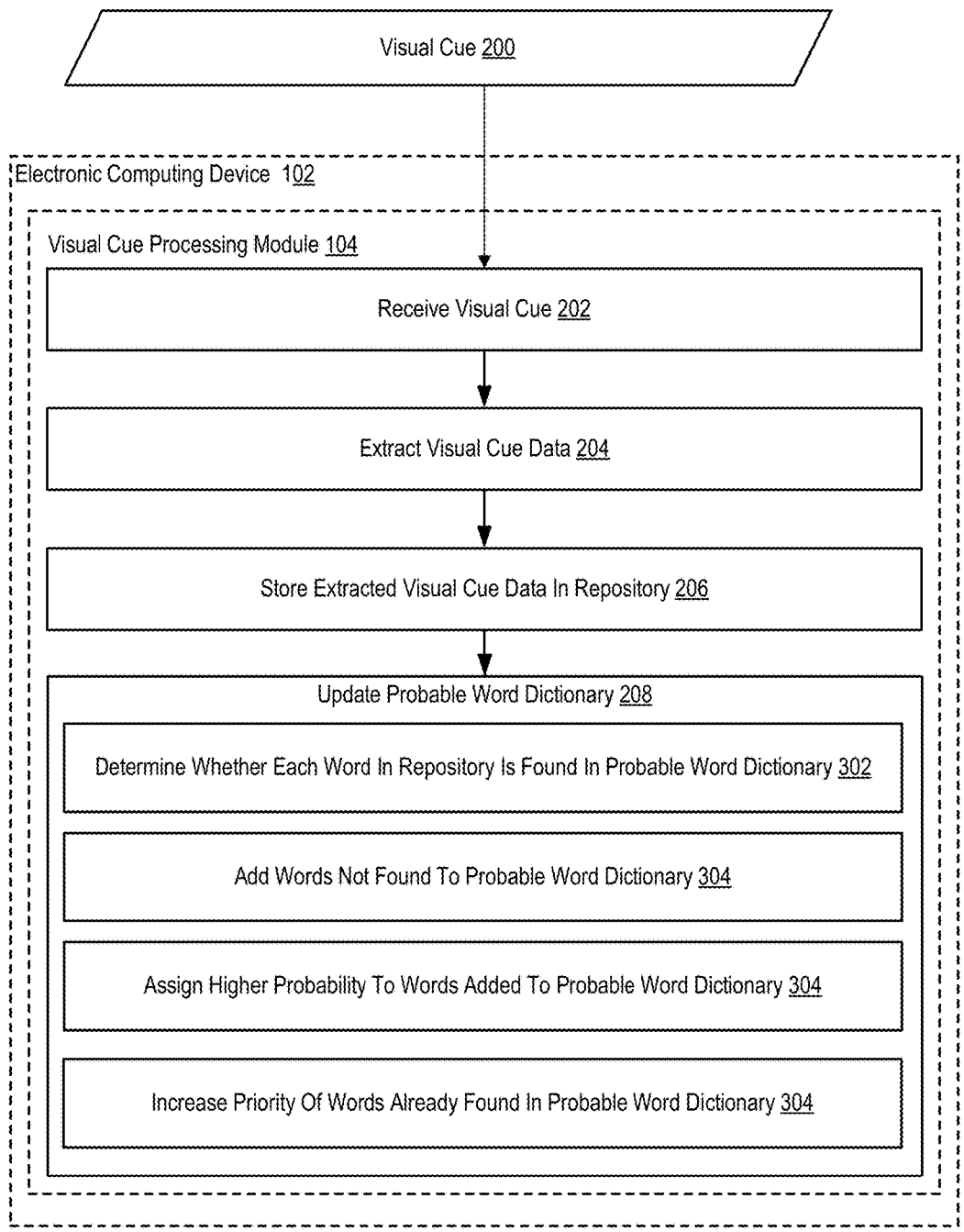
FIG. 3 sets for a flowchart further illustrating an example method of processing visual cues to improve understanding of an input according to embodiments of the present invention.

For further explanation, FIG. 3 sets forth a flow chart illustrating a further example method for processing visual cues to improve understanding of user inputs, according to embodiments of the present invention. The example method of FIG. 3 is similar to the example of FIG. 2 as it also includes receiving (202), by a visual cue processing module (104), a visual cue (200), extracting (204) by the visual cue processing module (104), visual cue identification data from the visual cue, and updating (208) a probable words dictionary.

In the example of FIG. 3, updating (208) a probable words dictionary can include determining (302), by the visual cue processing module (104) whether each word in the list of words generated from the visual cue appears in the probable words dictionary. If the word does not appear in the probable words dictionary, the word is added (304) to the dictionary. In accordance with some aspects of the invention, the added word may be assigned (306) a priority or weighting factor. If the word does appear in the probable words dictionary, a priority or weighting factor associated with the word may be increased (308). The updated and personalized probable words dictionary can be used by applications such as voice recognition, auto-complete, spell check, and the like to greatly improve the accuracy of understanding an input to an electronic computing device.

As will be appreciated by one skilled in the art, aspects of the presenting invention may be embodied as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   by first program instructions on a computing device:
   receiving a visual cue, said visual cue including visual media of a target, the visual media comprising a digital graphic image, the target comprising an object depicted in the image, the visual cue comprising a characteristic of the target;
   extracting visual cue identification data from the visual cue, including performing at least one of an image recognition operation and an object recognition operation;
   determining from the extracted visual cue identification data a list of words representing the target;
   storing the list of words representing the target;
   updating a probable words dictionary to include the list of words; and
   assigning a priority weighting factor to each word determined from the visual cue identification data extracted from the object depicted in the image and added to the probable word dictionary, wherein the priority weighting factor indicates that each word added to the probable word dictionary is given a higher priority than existing words in the probable word dictionary that were not determined from the visual cue identification data extracted from the object depicted in the image.

2. The method of claim 1 wherein the list of words comprises a description of the target, the description including at least one of a color, a size, a shape, a generic name, a specific name, and a location.

3. The method of claim 1 wherein updating the probable words dictionary comprises:
   determining whether each word in the list of words is present in the probable words dictionary; and
   for each word not found in the probable words dictionary, adding the word to the probable words dictionary.

4. The method of claim 3 further comprising, for each word from the list of words found in the probable word dictionary, increasing a priority weighting factor for said word.

5. An electronic computing device comprising a computer processor and a computer memory operatively coupled to the computer processor, the computer memory having disposed within it computer program instructions that, when executed by the computer processor, cause the electronic computing device to carry out the steps of:
   receiving a visual cue, said visual cue including visual media of a target, the visual media comprising a digital graphic image, the target comprising an object depicted in the image, the visual cue comprising a characteristic of the target;
   extracting visual cue identification data from the visual cue, including performing at least one of an image recognition operation and an object recognition operation;
   determining from the extracted visual cue identification data a list of words representing the target;
   storing the list of words representing the target;
   updating a probable words dictionary to include the list of words; and
   assigning a priority weighting factor to each word determined from the visual cue identification data extracted from the object depicted in the image and added to the probable word dictionary, wherein the priority weighting factor indicates that each word added to the probable word dictionary is given a higher priority than existing words in the probable word dictionary that were not determined from the visual cue identification data extracted from the object depicted in the image.

6. The electronic computing device of claim 5 wherein the list of words comprises a description of the target, said description including at least one of a color, a size, a shape, a generic name, a specific name, and a location.

7. The electronic computing device of claim 5, wherein updating the probable words dictionary comprises:
   determining whether each word in the list of words is present in the probable words dictionary; and
   for each word not found in the probable words dictionary, adding the word to the probable words dictionary.

8. The electronic computing device of claim 7, wherein updating the probable words dictionary further comprises, for each word from the list of words found in the probable words dictionary, increasing a priority weighting factor for said word.

9. A computer program product including a non-transitory computer readable storage medium, said computer program product comprising computer program instructions that, when executed, cause a computer to carry out the steps of:
   receiving a visual cue, said visual cue including visual media of a target, the visual media comprising a digital graphic image, the target comprising an object depicted in the image, the visual cue comprising a characteristic of the target;
   extracting visual cue identification data from the visual cue, including performing at least one of an image recognition operation and an object recognition operation;
   determining from the extracted visual cue identification data a list of words representing the target;
   storing the list of words representing the target;
   updating a probable words dictionary to include the list of words; and
   assigning a priority weighting factor to each word determined from the visual cue identification data extracted from the object depicted in the image and added to the probable word dictionary, wherein the priority weighting factor indicates that each word added to the probable word dictionary is given a higher priority than existing words in the probable word dictionary that were not determined from the visual cue identification data extracted from the object depicted in the image.

10. The computer program product of claim 9 wherein the list of words comprises a description of the one or more objects, the description including at least one of a color, a size, a shape, a generic name, a specific name, and a location.

11. The computer program product of claim 9 further comprising computer program instructions that, when executed, cause the computer to carry out the steps of:
    determining whether each word in the list of words is present in the probable words dictionary; and for each word not found in the probable words dictionary, adding the word to the probable words dictionary.

12. The computer program product of claim 11, further comprising computer program instructions that, when executed, cause the computer to carry out the step of, for each word from the list of words found in the probable words dictionary, increasing a priority weighting factor for said word.

* * * * *